United States Patent

Wilson et al.

[15] 3,707,028
[45] Dec. 26, 1972

[54] METHOD OF MAKING ACTUATING CAPSULE FOR FLUID PRESSURE REGULATOR

[72] Inventors: Calvin L. Wilson; John H. Fox, Jr., both of Chesterfield County, Va.

[73] Assignee: Reynolds Metals Company, Richmond, Va.

[22] Filed: Jan. 7, 1971

[21] Appl. No.: 104,752

Related U.S. Application Data

[62] Division of Ser. No. 735,722, June 10, 1968, Pat. No. 3,583,289.

[52] U.S. Cl. .........................29/404, 29/405, 29/509
[51] Int. Cl. ..............................................B23q 17/00
[58] Field of Search...............29/405, 404, 454, 509; 137/505.42; 73/410; 92/40, 98, 99

[56] References Cited

UNITED STATES PATENTS

| 2,152,781 | 4/1939 | Wile | 137/505.42 |
| 3,099,878 | 8/1963 | Woods | 29/405 |
| 3,176,872 | 4/1965 | Zundel | 220/54 |
| 3,272,166 | 9/1966 | Henchert | 29/509 X |
| 3,421,732 | 1/1969 | Golden | 92/98 R X |
| 3,435,505 | 4/1969 | Monroe, Jr. | 29/405 X |

*Primary Examiner*—John F. Campbell
*Assistant Examiner*—Victor A. DiPalma
*Attorney*—Glenn, Palmer & Lyne

[57] ABSTRACT

A method of making an enclosed actuating capsule for a fluid pressure regulator is provided by placing a plurality of cooperating wall-forming members in an assembly chamber, controlling the environment within the chamber, and assembling the members in the controlled environment of the chamber to form the capsule and simultaneously provide the controlled environment within the capsule during its assembly to thus provide a fully calibrated capsule.

10 Claims, 4 Drawing Figures

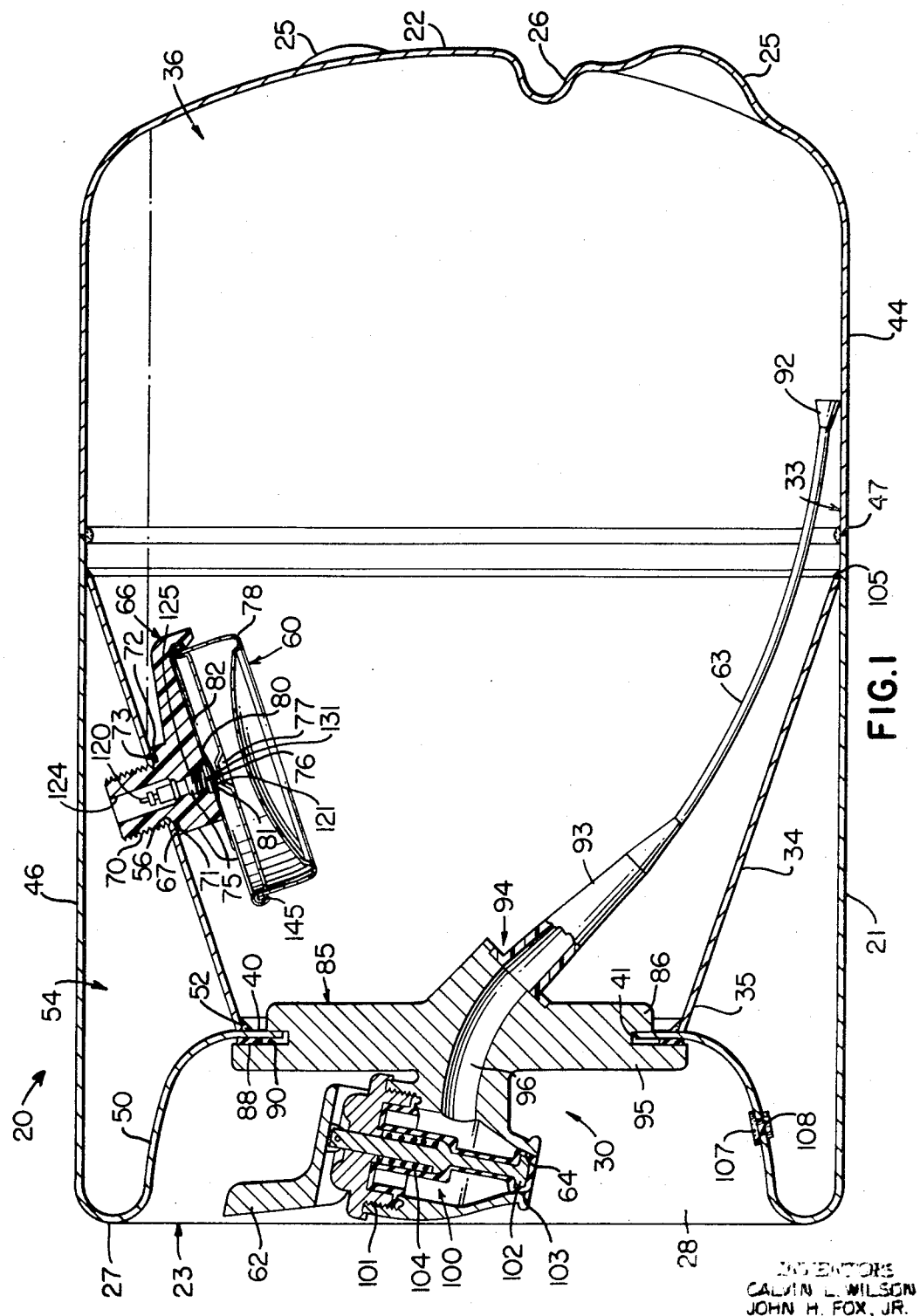

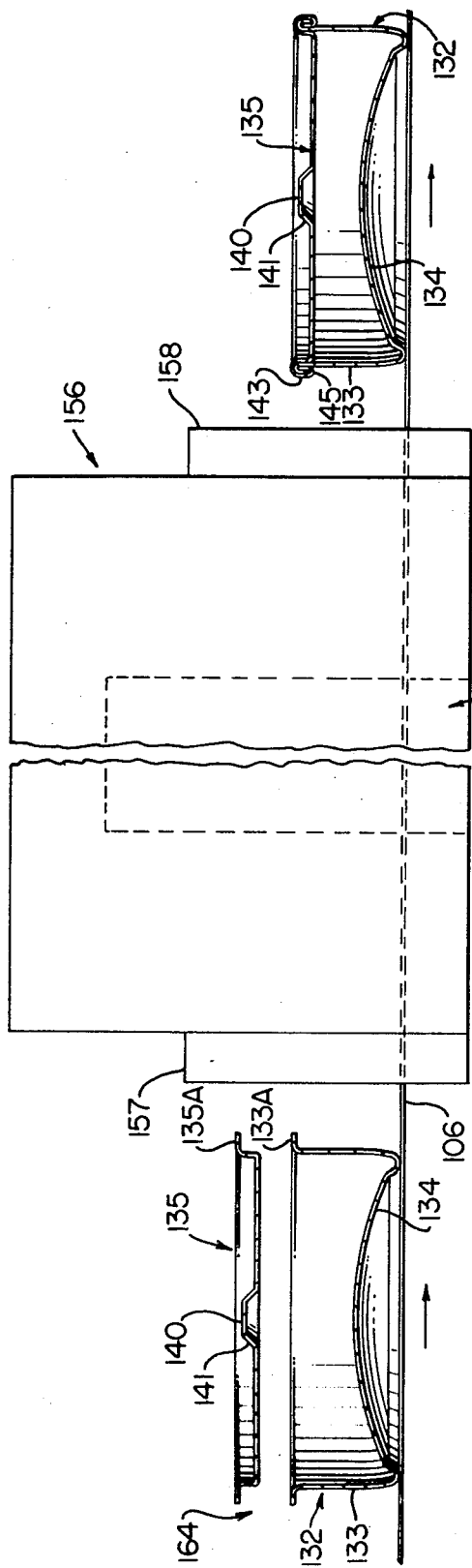
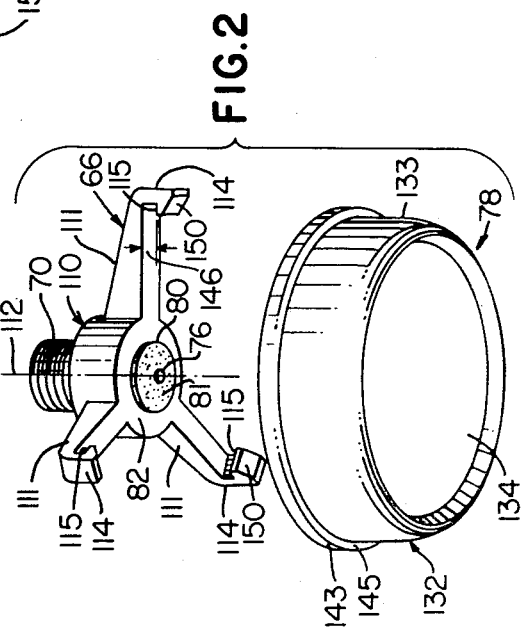
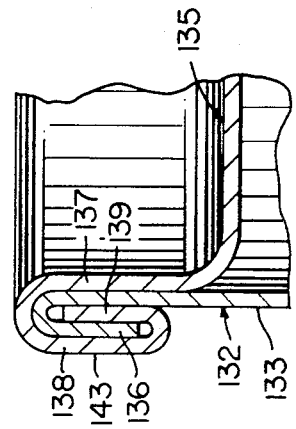

METHOD OF MAKING ACTUATING CAPSULE FOR FLUID PRESSURE REGULATOR

CROSS REFERENCE TO RELATED APPLICATION

This application is a divisional patent application of its co-pending parent application, Ser. No. 735,722 filed June 10, 1968, now U.S. Pat. No. 3,583,289 and is assigned to the same assignee to whom the parent application is assigned.

BACKGROUND OF THE INVENTION

Many liquids, such as carbonated beverages, are sold in comparatively large dispensing containers wherein each of such containers has a beverage-containing chamber which is pressurized with a charging fluid such as carbon dioxide and which is introduced into such chamber in a controlled manner through the use of a pressure regulator. The pressure regulators used to introduce carbon dioxide into associated beverage-containing chambers of present dispensing containers are of complex construction and utilize actuators or actuating capsules which are complicated and thus expensive to manufacture, require additional component parts to enable introduction and control of the amount of a suitable actuating fluid within each capsule, and are difficult to install in actuating position on associated pressure regulators.

SUMMARY

This invention provides an improved actuating capsule for a fluid pressure regulator which is of simple and economical construction, is readily supported on an associated support therefor, and which does not require additional components or procedures to calibrate such capsule after assembly thereof.

Further, this invention provides an improved method of making an actuating capsule of the character mentioned which is, in effect, fully calibrated simultaneously with the final assembly of its component members.

Other details, uses, and advantages of this invention will become apparent as the following description of the embodiment thereof presented in the accompanying drawings proceeds.

BRIEF DESCRIPTION OF THE DRAWINGS

The accompanying drawings show a present preferred embodiment of this invention, in which FIG. 1 is a cross-sectional view of a container of the type particularly adapted to store and dispense a carbonated beverage from a beverage-containing chamber thereof and through a spigot assembly comprising such container, and which uses a charging fluid which is introduced in a controlled manner from another chamber provided in the dispensing container through a pressure regulator into the beverage-containing chamber to force the beverage through the spigot assembly upon opening thereof;

FIG. 2 illustrates an exploded perspective view of the pressure regulator used in the container of FIG. 1 and showing the improved actuating capsule of this invention arranged beneath the remainder of such pressure regulator;

FIG. 3 is a schematic view with parts in section and parts broken away particularly illustrating an exemplary actuating capsule of this invention comprised of only two component members which may be assembled together in an associated controlled environment assembly chamber to provide such actuating capsule which does not require further calibration; and FIG. 4 is an enlarged fragmentary sectional view particularly showing the manner of mechanically fastening the two component members of the capsule of this envention together.

DESCRIPTION OF ILLUSTRATED EMBODIMENT

Reference is now made to FIG. 1 of the drawings wherein a cross-sectional view of an improved container for storing and dispensing a liquid product under gaseous pressure is illustrated and designated generally by the reference numeral 20. The container 20 of this example of the invention is particularly adapted for dispensing a carbonated beverage such as beer, soft drinks, and the like and has a substantially right circular cylindrical outline designated generally by the reference numeral 21, a rear wall 22, and a recessed front wall indicated generally by the numeral 23. The container 20 is also well suited for dispensing non-carbonated beverages and other liquids.

The container 20 has a plurality of symmetrically arranged protrusions each designated by the reference numeral 25 provided in its rear wall 22 which may be formed as an integral part of such rear wall and are utilized to stand the container 20 in an upright manner while supporting it on the protrusions 25. The rear wall 22 also has an elongated slot 26 provided therein which is adapted to receive a positioning member therewithin to orient the container 20 on an automatic assembly line along which container 20 is moved to enable charging a propellant-containing chamber thereof with a suitable propellant used to force the carbonated beverage out of such container through a suitable spigot assembly and in a manner to be described in detail subsequently in this specification.

The front wall 23 is recessed inwardly of a front peripheral edge 27 of the cylindrical side wall 21 so as to define a cavity 28 in the front end of the dispensing container 20. A spigot assembly designated generally by the reference numeral 30 is constructed and arranged so that it is readily installed within the cavity 28 and so that it is completely protected and does not provide an unsightly protrusion outwardly of the front edge 27 of the dispensing container 20 while also enabling the dispensing container 20 to be inverted and supported on the front edge 27 of its cylindrical side wall without interference by the spigot assembly 30, if desired.

The dispensing container 20 comprises an enclosing wall which is designated generally by the reference numeral 33 which has a tapered front end section 34 which terminates in a smaller end designated by the reference numeral 35. The enclosing wall 33 defines a first chamber which contains a liquid such as a carbonated beverage which is maintained under gaseous pressure by a suitable pressurizing gas. The tapered section 34 of the enclosing wall 33 terminates in an annular portion 40 which defines an open end or opening 41 for the enclosing wall 33. The spigot assembly 30 is fastened against the annular portion 40 to seal the open end 41 in a fluid-tight manner and the operation of the spigot assembly 30 and the manner of fastening such spigot assembly in position will be described in more detail subsequently in this specification.

The rear section of the enclosing wall 33 comprising the container 20 is designated by the reference numeral 44 and comprises a forward portion of substantially right circular cylindrical outline and an integral rear portion which defines the rear wall 22 of container 20. The front section of container 20 is defined by an outer substantially tubular wall 46 which is fastened in sealed relation around the outer periphery of the enclosing wall 33 adjacent the larger end of its tapered portion 34 and in this example of the invention the outer tubular wall portion 46 is fastened to the enclosing wall 33 by a continuous circumferential weld 47.

The outer tubular wall 46 has an inner or rear portion which is of right circular cylindrical outline and an outer or forward portion provided with a substantially radially inwardly directed integral flange 50 which has a contoured configuration. The forward end of the tapered portion 34 is fastened to flange 50 in sealed relation as by welding and as shown at 52 so as to define annular portion 40 which in this example comprises an integral part of flange 50.

The tubular wall 46 with its outer end portion or flange 50 is thus fastened in position to enclosing wall 33 at 47 at its inner end and at 52 at its outer end so as to define a second propellant-containing chamber designated generally by the reference numeral 54 between the tapered wall section 34 and the outer wall section 46 and the chamber 54 is particularly adapted to contain a charging fluid such as a gas under pressure which is introduced in a controlled manner within chamber 36 to pressurize the carbonated beverage within the chamber 36 and in a manner as will be described in detail subsequently and thereby enable drawing the carbonated beverage through the spigot assembly 30.

The tapered section 34 of enclosing wall 33 may be in the form of a substantially frustoconical section and has a threaded aperture 56 provided therein for placing the liquid chamber 36 in flow communication with a source of pressurizing fluid which is carried externally of chamber 36 and in this example of the invention the pressurizing fluid is in the form of a pressurizing gas which is carried within the outer pressure chamber 54. In using container 20 for dispensing a carbonated beverage the pressurizing gas in chamber 54 is preferably carbon dioxide.

The storing and dispensing container 20 has a pressure regulator designated generally by the reference numeral 60 which is fastened in flow communication with the aperture 56 and the pressurizing fluid carried in chamber 54 and allows the pressurizing fluid to be introduced into the chamber 36 when the pressure level within the chamber 36 is below a predetermined level. The pressurizing gas is metered by the pressure regulator 60 into the chamber 36 in a controlled manner and upon opening a lever 62 provided on the spigot assembly 30 the pressurized liquid, i.e. carbonated beverage, in chamber 36 is forced through a siphon tube 63 comprising the spigot assembly 30 and outwardly through a dispensing opening 64 provided in the spigot assembly 30 and in a known manner.

The pressure regulator 60 has a unique support designated generally by the reference numeral 66 which has an annular shoulder 67 provided thereon and a fastener for fastening the support 66 to associated supporting structure and such fastener is in the form of a threaded outer portion 70. The annular shoulder 67 is provided concentrically around the base of threaded outer portion 70 and also has an annular groove 71 which carries a suitable seal such as an O-ring seal 72.

The aperture 56 provided in the frustoconical tapered portion 34 is in the form of a threaded aperture, as previously mentioned, and the threaded portion 70 of support 66 is threaded through the threaded aperture 56 so that the O-ring seal 72 is urged and clamped against an annular portion 73 comprising the inside surface of the tapered section 34 to thereby provide a fluid-tight seal between the pressurizing chamber 54 and the chamber 36 of the dispensing container 20.

The pressure regulator 60 has a normally closed control valve 75 which is of known construction and commonly referred to as a Schrader valve provided as an integral part thereof; therefore, the valve 75 will not be described in detail. The valve 75 has a telescoping plunger or outwardly extending telescoping valve stem 76 which is normally resiliently held outwardly. The valve stem 76 is engaged by an outward projection 77 provided on an outer surface of an expandible and contractible volume capsule 78 of this invention and the projection 77 is adapted to move the stem 76 and control the flow of pressurizing fluid through valve 75 and into the chamber 36.

The improved capsule 78 of this invention is hermetically sealed and contains a suitable actuating fluid under a predetermined controlled pressure and as will be apparent from FIG. 1 of the drawings the entire capsule 78 is exposed to the pressure environment of chamber 36. A detailed presentation of the actuating capsule of this invention and the unique technique which is used to make such capsule will be made later in this specification. The operation of the pressure regulator 60 is of utmost simplicity and as the pressure in the chamber 36 decreases, due to drawing off carbonated beverage, for example, the actuating fluid within the capsule 78 expands and moves projection 77 outwardly and against stem 76 to thereby open valve 75 and allow fluid from chamber 54 to enter the chamber 36. As the pressurizing fluid or carbon dioxide enters chamber 36 the pressure exerted against the exposed surface of capsule 78 increases thereby moving projection 77 away from step 76 and once the correct pressure is reached within the chamber 36 the volume of capsule 78 is contracted to the desired reduced level whereby projection 77 allows the stem 76 to move to an extended position and the flow of pressurizing fluid through the valve 75 is stopped. This operation is repeated as more carbonated beverage is drawn from within the chamber 36 through the spigot assembly 30 until the entire supply of carbonated beverage within chamber 36 is used.

As the stem 76 of the control valve 75 is pushed inwardly, the carbon dioxide flows through the valve 75 and redially outwardly from an edge 80 of a cup-shaped resilient member 81 which is fixed to the terminal end of the stem 76 and serves as a one-way check valve. The member 81 may be made of a rubber-like material and is fixed adjacent the terminal outer end of the stem 76 in a fluid-tight manner and so that its edge 80 is resiliently held against an associated planar surface 82 of support 66.

The action of member 81 is such that the carbon dioxide pushes edge 80 away from the surface 82 as it flows toward chamber 36 to adjust the pressure level within chamber 36; however, any tendency for fluid within chamber 36 to flow toward the valve 75 is prevented by edge 80 being urged by such fluid tightly against the planar surface 82 and in the typical manner of a check valve.

The capsule 78 of pressure regulator 60 preferably has an inert gas, such as nitrogen, or the like, hermetically sealed therewithin. The utilization of an inert gas assures that there is a minimum tendency for the pressure regulator 60 and thus the absolute pressure within the chamber 36 to be influenced by changes in the temperature environment in which container 20 is used and hence the temperature within the chamber 36.

For example, in utilizing the container 20 for storing and dispensing a relatively highly carbonated cola drink pressurized by carbon dioxide, the pressure within chamber 36 is approximately 25 psig with the temperature in such chamber at 40° F. As the temperature within chamber 36 increases to 70° F. the resulting pressure within chamber 36 due to the released carbon dioxide is approximately 40–50 psig. These temperatures and pressures in the order presented above are common in using dispensing container 20 while it is kept in a normal household refrigerator and while it is exposed to a normal room ambient temperature respectively. Also, it will be appreciated that the absolute pressure within chamber 36 would be the above indicated pressures plus the normal ambient pressure for the particular altitude.

If the gas within the capsule 78 were to be of the type which expands rapidly due to increased temperature, then the tendency would be to prematurely introduce more carbon dioxide within chamber 36 and an over carbonation of the beverage within the chamber 36 would result which would be undesirable. Thus, the need for utilizing an inert gas within the capsule 78 is readily apparent to help prevent over carbonation of the beverage within the chamber 36 and thus assure such beverage is drawn from the spigot assembly 30 with minimum foaming and having optimum palatability.

The improved pressure regulator 60 is supported within the fluid chamber 36 solely by the tapered frustoconical section 34 of enclosing wall 33 and such pressure regulator is smaller in size than opening 41 and thus easily moved and installed within or removed from the chamber 36. The opening 41 is also sufficiently large in size that it enables the inside surface of the enclosing wall 33 which defines the liquid chamber 36 to be easily cleaned with a suitable cleaning fluid and properly flushed.

The spigot assembly 30 may be fastened in position using a bayonet type connector which is of known construction and designated generally by the reference numeral 85. A yieldingly compressible O-ring seal 88 is utilized between the outside surface of the annular portion 40 comprising flange 50 and compressed thereagainst by an annular surface 90 of spigot assembly 30 to provide a fluid-tight seal between the spigot assembly 30 and the fluid chamber 36. The seal 88 may be a separate seal or such seal may be provided as an integral part of surface 90 or as an integral part of the outside surface of annular portion 40.

The spigot assembly 30 has a siphon tube 63 which, in this example, has an inlet section 92 of converging flow area and an outlet section 93 of diverging flow area which is fastened to the main portion of the spigot assembly 30 by any suitable means and as shown at 94. The spigot assembly 30 may be comprised of a one-piece housing 95 which has the bayonet connector 85 provided at its inner end portion as an integral part thereof and the housing 95 has an integral liquid dispensing passage 96 extending therethrough and terminating in the previously mentioned dispensing opening 64.

A normally closed spigot valve assembly 100 has male threads provided thereon which are threaded in cooperating female threads provided on the one-piece housing 95 as shown at 101 to detachably fasten valve assembly 100 to housing 95. The valve assembly or valve 100 has a tapered plug 102 corresponding in peripheral outer outline to the outline of an inside surface 103 defining opening 64 so that upon pulling the lever 62 forwardly to an open position the carbonated beverage contained within the chamber 36 is forced by the carbon dioxide gas through the siphon tube 63 and through the dispensing opening 64 in a known manner. Once the lever 62 is released a compression spring 104 within the valve assembly 100 urges the tapered plug 102 against the cooperating surface 103 to provide a substantially dripless spigot for the dispensing container 20.

As previously indicated, the container 20 has a charging or pressurizing fluid provided in its chamber 54 and for a carbonated beverage such charging fluid may be in the form of a pressurizing gas such as carbon dioxide. The carbon dioxide gas is introduced in the chamber 54 using a suitable charging needle which is inserted through a charging plug 107 provided in the flange portion 50 of wall 46. The plug 107 may be of any suitable known construction and made of a rubber-like resilient material and such plug extends through an opening 108 provided in the flange portion 50 and is suitably held in position by a pair of integral flange portions thereof which extend against the inside and outside surfaces respectively of flange 50 which adjoin the opening 108.

Reference is now made to FIGS. 1 and 2 of the drawings for a more detailed presentation of the pressure regulator 60. The pressure regulator 60 has its support 66 preferably made of a resilient non-metallic plastic-like material such as nylon, for example, and is formed as one integral unit. Support 66 has a supporting hub 110 and a plurality of radial arms each designated by the same reference numeral 111 extending from the lower portion (as viewed in the drawings) of the hub 110 and in a symmetrical manner about a central axis 112 of hub 110 and hence support 66.

Although any desired number of arms 111 may be formed in the support 66 so as to define a supporting yoke or spider arrangement, in this example of the invention a plurality of three arms 111 are utilized and such arms are spaced 120° apart. Each arm 111 extends substantially perpendicular to the central axis 112 of the support 66 and each arm has a holding member which is adapted to engage and hold the upper end portion of the improved actuating capsule 78 of this invention in position against the support 66 and in a manner to be described in more detail subsequently in this specification. In particular, it will be seen that the holding member provided on each arm 111 is in the form of an inwardly hooking terminal end 114 which is provided with a supporting ledge 115 which engages a portion of the actuating capsule 78. The ledges 115 provided on arms 111 cooperate to support the capsule 78 against support 66 and so that its outward projection 77 is precisely positioned with respect to the actuating stem 76 of control valve 75.

As will be apparent from FIG. 1 of the drawings, the threaded outer portion 70 of support 66 is provided at the upper portion of hub 110 and the arms 111 extend outwardly from the lower portion of such hub. Also, the control valve 75 is provided as an integral part of support 66 and has an inlet 120 which is in flow communication with the pressurizing fluid in pressure chamber 54 and an outlet 121 which extends beneath the lower portion of the support 66 and is in flow communication with the chamber 36 of the container 20.

The valve 75 may be fixed to support 66 in any suitable manner so as to provide a fluid-tight seal therebetween; however, support 66 may be made of an easily moldable plastic-like material which is molded around the control valve 75 so that it is fixed thereto to form a unitary construction while allowing fluid flow through the valve 75 in an unobstructed manner. In forming the support 66 by molding such support 66 around the control valve 75 it will be appreciated that a central opening is provided through the hub portion 110 of support 66 and such central opening has an upper part 124 which receives an associated upper end portion of the control valve 75 and such upper part provides a passage for the pressurizing fluid through the upper end portion of the support 66 to the inlet 120 of the control valve 75. The central opening provided in the hub 110 also has a lower part 125 which is determined by the adjoining configuration of a control valve 75.

The valve 75 is integrally bonded as a unitary construction within the support 66 and so that the stem or telescoping plunger 76 extends outwardly of the control valve 75 and below or outwardly of the planar surface 82 and so that its outer extremity shown at 131 is in a predetermined position with respect to the support 66 and upon fastening the actuating capsule 78 in position the valve 75 will operate in the desired manner and as previously described. In particular, the terminal end 131 of the valve stem 76 is adapted to be engaged by the outward projection 77 of actuating capsule 78 to thereby actuate the stem 76 in response to the pressure environment surrounding the actuating capsule 78.

The improved actuating capsule 78 of this invention is made of only two component parts or members which are designated respectively by the reference numerals 132 and 135 and which will now be described in detail, see FIGS. 2-4.

The member 132 is defined by an unyielding and substantially smooth right circular cylindrical side wall portion 133 which has an inwardly concave bottom wall 134 which is formed as an integral part of the side wall 133. The side wall 133 (in the completed capsule 78) also has a downwardly hooking peripheral flange 136. The bottom wall 134 has the form of an inwardly concave spherical sector and thus provides optimum resistance to outward deflection. Similarly, the cylindrical side wall 133 blends smoothly with bottom wall 134 around the lower peripheral edge thereof on a smooth arc so that the member 132 remains substantially intact under all operating conditions and the change in volume of capsule 78 is reflected primarily by movement of its top member 135.

The member 135 defines the top wall of the capsule 78 and thus will also be referred to as top wall 135. In the completed capsule member 135 has a downwardly hooking or opening substantially U-shaped peripheral flange having a pair of parallel leg portions 137 and 138 and terminating in a reversely hooking terminal end portion 139. The above described peripheral flanges are fastened together as by mechanical swaging and using seaming rolls whereby the flange 136 is sandwiched in position between leg portion 138 and the reversely hooking flange portion 139 to define a fluid-tight chime 143 at the top of the capsule 78.

To assure that there is minimum flexing at the area of contact between the stem 76 of the control valve 75 and the associated outer surface of the actuating capsule 78, the previously mentioned outward projection 77 is provided in the center portion of top wall 135 and aligned to assure that stem 76 will engage such projection. The projection 77 is comprised of an outer planar surface 140 which is of circular peripheral outline and is adjoined around the periphery thereof by an outwardly flaring or diverging frustoconical surface portion 141 the lower or larger diameter portion of which blends smoothly with the remaining portion of top wall 135. As the fluid contained within the actuating capsule 78 expands and contracts the projection 77 also moves in a corresponding manner and the flat portion 140 thereof is urged against the stem 76 with substantially no deflection or flexing at the area of contact and thus the actuation of stem 76 and hence the flow of carbon dioxide into chamber 36 is more accurately responsive to the movement of the top wall or member 135 as determined by the pressure within the beverage-containing chamber 36. Further, because of the unyielding nature of side wall 133 and bottom wall 134 the amount that the top wall 135 moves is greatly amplified.

The top wall 135 is fastened in position against the open end of the right circular cylindrical wall 133 of the actuating capsule 78 to define the previously mentioned chime 143 and such chime 143 has a lower edge 145 which is adapted to be supported on the supporting ledges 115 of the radial arms 111 provided on the support 66. The height of the chime 143 and the general construction thereof is closely coordinated with the height shown at 146 on each hooking terminal end 114 of an associated arm 111 and the various other surfaces, such as surfaces 82 and 115, of support 66 are also controlled with respect to the position in which the control valve 75 is molded so as to assure that the convex projection 77 is positioned at the desired location relative to the stem 76 of control valve 75 to further assure that the pressure regulator 60 responds accurately to the pressure which surrounds its actuating capsule 78.

As previously indicated the support 66 is preferably made of a resilient plastic-like material such as nylon, or the like, which also provides optimum corrosion resistance. In using such a resilient material, it will be appreciated that the arms 111 may be slightly deflected adjacent their inwardly hooking terminal ends 114 so that the chime 143 may be placed inwardly of supporting ledges 115 and upon releasing the deflecting forces against arms 111 such arms are snap-fitted around the chime 143 of actuating capsule 78 to thereby readily fasten such capsule in position.

The inwardly hooking terminal end 114 of each radial arm 111 has an inclined cam surface 150 formed thereon and each cam surface 150 terminates at a location defining one edge of supporting ledge 115. The cam surfaces 150 provide a camming action upon urging the chime 143 of a capsule 78 thereagainst which slightly deflects the resilient arms 111 away from such capsule momentarily and also aids in causing such arms to be snap-fitted around the chime 143.

The actuating capsule 78 is in the form of a substantially right circular cylindrical can which may be made of any suitable material such as metal containing aluminum, for example. In one application of this invention 5052-H36 aluminum having a nominal thickness of 0.0140 inch was used with satisfactory results. Further, the chime 143 is preferably formed at the top of capsule 78 so that it has optimum hoop strength to enable the capsule 78 to be easily snap-fitted in position merely by urging chime 143 against the outer end portions of arms 111.

The improved actuator or actuating capsule 78 of this invention is of utmost simplicity in that it only has two component parts namely members 132 and 135, as stated above, and the capsule 78 is formed in such a manner that it does not need to be calibrated and hence does not require a separate calibration plug, or the like. A detailed presentation will now be made with reference to FIG. 3 of the drawings to highlight the manner in which the improved capsule 78 of this invention is formed.

Basically the component parts or members 132 and 135 comprising actuating capsule 78 are moved into an assembly chamber shown at 155 and assembled in a manner as will be presently described while controlling the environment within chamber 155 whereby the resulting actuating capsule 78 formed within the controlled environment chamber 155 is, in effect, fully calibrated in that it contains the proper amount of actuating fluid to be contained within the actuating capsule 78. The controlled environment assembly chamber 155 comprises part of an overall structure designated generally by the numeral 156 which has control locks 157 and 158 arranged on opposite sides of the central chamber 155.

The technique used to control the environment within assembly chamber 155 together with the utilization of associated control locks 157 and 158 on opposite sides of chamber 155 is well known in the art and a similar technique is presented in application Ser. No. 593,977, filed Nov. 14, 1966. Therefore, a detailed description of chamber 155 and its associated locks 157 and 158 will not be presented in this specification.

It is to be understood, however, that the control locks on opposite sides of the assembly chamber 155 enable the members 132 and 135 to be moved into the assembly chamber 155 while maintaining the controlled environment within chamber 155.

Although any suitable means may be utilized to move the members 132 and 135 into the assembly chamber 155, in this example of the invention such members are moved by a mechanical conveyor 106 which moves an associated pair of members 132 and 135 in a sequential manner first through control lock 157, then into assembly chamber 155, and then through control lock 158 and out of the entire apparatus 156 as a completed and fully calibrated capsule 78.

The environment within assembly chamber 155 may be controlled in any suitably known manner and any suitable actuating fluid may be utilized within chamber 155 and such fluid is controlled in temperature and pressure while it is within such chamber. In this example of the invention, the fluid is flowed from a suitable source thereof and introduced within chamber 155 so that it is at a positive pressure above normal atmospheric pressure for the particular altitude at which the particular chamber 155 is being utilized. As previously indicated, one actuating fluid which may be utilized is in the form of an inert gas such as nitrogen.

As the members 132 and 135 are introduced within the assembly chamber 155 and suitably fastened together, a volume of nitrogen at a predetermined controlled temperature and pressure is trapped within the enclosure defined by the fastened members 132 and 135. The amount of nitrogen trapped within such enclosure or space is determined by the volume of such enclosure; however, the self calibration of capsule 78 is achieved by controlling the overall ambient temperature and pressure of the nitrogen within chamber 155 whereby the correct amount of nitrogen in thus contained within the resulting capsule 78 simultaneously with fastening members 132 and 135 together. Once the completed capsule 78 is moved from chamber 155 and used on a pressure regulator 60 it will respond in the desired manner to move the outward projection 77 toward and away from the stem 76 of the control valve 75 and thereby control flow of pressurizing fluid through the pressure regulator 60.

The members 132 and 135 are mechanically fastened together within chamber 155 preferably using seaming rolls of known construction. Therefore, such seaming rolls will not be described in detail in this specification.

Prior to moving the members 132 and 135 within the chamber 155 such members are supported on suitable fixtures in a predetermined aligned manner so that upon moving such members into the chamber 155 they may be readily assembled with minimum handling. In particular, it will be seen at 164, in FIG. 3, that the top wall forming member 135 is supported in aligned relation immediately above member 132 by a suitable fixture and so that it has a straight annular peripheral strip 135A aligned immediately above an associated straight annular peripheral strip 133A extending from the top edge of the side wall 133 of member 132.

Upon moving the members 132 and 135 into the assembly chamber 155 the terminal end portion of annular strip 135A is folded around annular strip 133A to define a first seam and the then resulting first seam is folded against the top portion of the side wall 133 beneath the top edge thereof to form chime 143. The final detailed configuration of the chime 143 comprised of flange portions 136–139 was previously described in detail and shown in FIG. 4 of the drawings and it will be appreciated that such configuration is formed by folding the straight annular strips 133A and 135A in the manner described above.

The technique of mechanically fastening together the members 132 and 135 utilizing seaming rolls assures that such members are fastened together with minimum heat dissipation within the controlled environment chamber 155. This assures that the environment within chamber 155 is maintained comparatively stable at all times and further assures that the resulting capsule 78 is fully calibrated.

The actuating capsule 78 of this invention is thus made of basically two component parts which are assembled in a controlled environment to provide the proper conditions, i.e., the correct amount of nitrogen gas at a controlled temperature and pressure, within capsule 78 so that such capsule does not need to be calibrated and once such capsule is utilized on an associated pressure regulator 60 it provides accurate and reliable performance. Further, the actuating capsule 78 of this invention also has substantially continuous easily formed surfaces throughout its exposed surface area and because it is fully calibrated it eliminates potential leakage points which might otherwise be created if calibration plugs, or the like, were to be required. Thus, the construction of the capsule 78 further assures reliable performance during continued use.

While a present exemplary embodiment of this invention, and method of making same, have been illustrated and described, it will be recognized that this invention may be otherwise variously embodied and practiced within the scope of the following claims.

What is claimed is:

1. A method of making an enclosed actuating capsule for a fluid pressure regulator comprising the steps of, placing a plurality of cooperating wall-forming members in an assembly chamber, controlling the environment within said chamber, and assembling said members in the controlled environment of said chamber to form said capsule and simultaneously provide said controlled environment within said capsule during assembly thereof to thus provide a fully calibrated capsule.

2. A method as set forth in claim 1 in which said placing step comprises placing a first and a second wall-forming member in said assembly chamber, said first member defining an unyielding and substantially smooth cylindrical side wall for said capsule having an open end portion and an integral bottom wall which has an inwardly concave configuration, said second member defining a top wall for said capsule having an actuating surface adapted to operatively associate with a control valve comprising said pressure regulator, and said assembling step comprises the step of mechanically fastening said top wall over said open end portion of said side wall in a fluid-tight manner.

3. A method as set forth in claim 2 in which said step of mechanically fastening said top wall comprises the steps of folding an annular peripheral strip of said top wall around an associated peripheral annular strip extending perpendicularly from the top edge of said side wall to define a first seam and then folding said first seam against said side wall beneath said top edge to form a chime at the top of said capsule.

4. A method as set forth in claim 3 in which said steps of folding said annular strips comprise seaming said strips together using mechanical seaming rolls to thus fasten said members together with minimum heat dissipation within said chamber and thereby further assure provision of a fully calibrated capsule.

5. A method as set forth in claim 1 in which said step of controlling the environment within said chamber comprises the step of flowing a pressurizing fluid into said chamber and controlling the temperature and pressure thereof within said chamber.

6. A method as set forth in claim 5 in which said step of flowing a pressurizing fluid within said chamber comprises flowing an inert pressurizing gas within said chamber.

7. A method as set forth in claim 1 in which said placing step comprises placing a first and a second wall-forming member in said assembly chamber, said first member defining an unyielding and substantially smooth cylindrical side wall for said capsule having an open end portion and an integral bottom wall which has an inwardly concave configuration in the form of a spherical sector, said second member defining a top wall for said capsule having an actuating surface in the form of an outward projection which is adapted to engage and actuate a telescoping stem of a control valve comprising said pressure regulator, said assembling step comprises the step of mechanically fastening said top wall over said open end portion of said side wall in a fluid-tight manner, and said step of controlling the environment within said chamber comprises the step of flowing an inert pressurizing gas into said chamber and controlling the temperature and pressure thereof within said chamber.

8. A method as set forth in claim 7 in which said placing step comprises the step of mechanically moving said members into said assembly chamber on a mechanical conveyor to enable making said capsule in a continuous assembly operation.

9. A method as set forth in claim 8 in which said placing step comprises the further steps of utilizing control locks arranged on opposite sides of said chamber to enable moving said members within said chamber and each fully calibrated completed capsule out of said chamber while maintaining a precisely controlled environment within said chamber.

10. A method as set forth in claim 8 in which said step of mechanically moving said members into said chamber comprises the preparation step of supporting said first and second members in a predetermined aligned manner so that upon moving said members into said assembly chamber they may be readily assembled with minimum handling.

* * * * *